T. STRETTON.
ELECTRIC CELL FOR MINERS' LAMPS AND FOR SIMILAR PURPOSES.
APPLICATION FILED AUG. 11, 1919.

1,357,126.  Patented Oct. 26, 1920.

Inventor
T. Stretton
by
W. E. Evans
Attorney.

UNITED STATES PATENT OFFICE.

THEODORE STRETTON, OF CARDIFF, WALES, ASSIGNOR TO HASLAM & STRETTON LIMITED, OF CARDIFF, WALES.

ELECTRIC CELL FOR MINERS' LAMPS AND FOR SIMILAR PURPOSES.

1,357,126.  Specification of Letters Patent.  Patented Oct. 26, 1920.

Application filed August 11, 1919. Serial No. 316,792.

*To all whom it may concern:*

Be it known that I, THEODORE STRETTON, a subject of the King of Great Britain and Ireland, residing at 11 Windsor Place, Cardiff, Wales, have invented certain new and useful Improvements Relating to Electric Cells for Miners' Lamps and for Similar Purposes, of which the following is a specification.

This invention relates to cells for miners' lamps and for similar purposes.

According to the invention the electrodes are provided one within the other and are carried upon supports at the bottom of the casing by which they are held immovable therein and means provided by which the connection of the container of the lamp to the top part of the lamp can only be effected on the cell being properly positioned within its container.

The invention comprises the features which are hereinafter described.

The invention is illustrated in the accompanying drawings in which—

Figure 1:
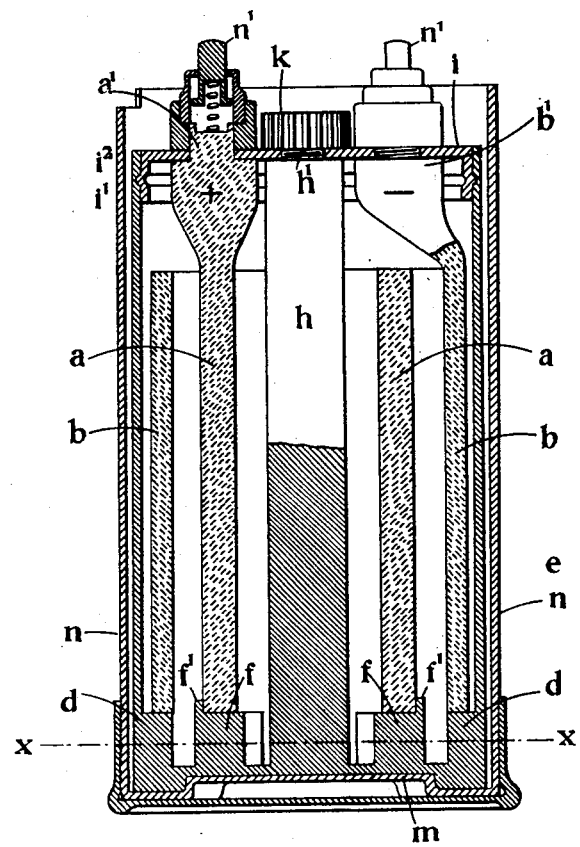
Figure 2:
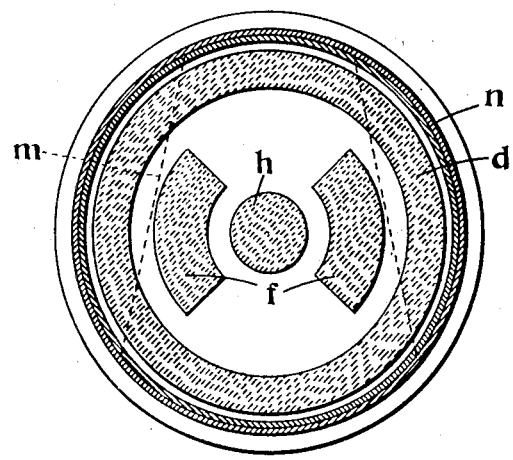

Figure 1 is a sectional elevation of a cell constructed according to the invention, while Fig. 2 is a sectional plan on the line $x$—$x$ Fig. 1.

In carrying the invention into effect as illustrated in the accompanying drawings, the plates $a$ and $b$ of the cell are by simple and effective means supported and held in position therein, slightly above the bottom of the cell casing $e$, and for this purpose the bottom of the cell casing is provided with an annular ledge $d$ near or adjacent the wall, upon which ledge, the negative plate $b$ of cylindrical form may rest, while in a position approximately between the center and the wall of the cell casing to or more rests $f$ of a segmental form are provided upon which the positive plate $a$ of cylindrical form may rest. Two such rests $f$ disposed concentrically in opposite positions, and of the same height as the ledge $d$ may be provided, leaving intervening spaces between. The outer edges of these rests $f$ have upstanding flanges $f^1$ for retaining the lower end of the positive plate $a$ in position on the rests. The ledge $d$ and the rests $f$ may be provided separate from but secured to the bottom of the cell, or they may as illustrated be provided integral therewith. This may conveniently be done when the cell is provided, as is preferred, from celluloid or vulcanite.

Similarly a central post $h$ may be provided in the cell secured to or integral with the bottom and of the same material. This post $h$ may extend to the upper end of the cell casing, and may be provided with a screw threaded extremity $h^1$ to pass through a central hole in the lid $i$ of the cell casing, and for the reception of a nut $k$ by means of which the lid $i$ may be held in position.

The bottom of the cell casing $e$ is provided, on its under face, with a recess of a shape corresponding to a projection $m$ or projections in the bottom of the container $n$ by which the cell casing is carried and secured beneath the lamp top in the usual way, so that the cell casing $e$ can only be fitted therein when the cell casing is properly disposed in one particular position with reference to the container $n$. The recess in the bottom of the cell casing may advantageously take a dove-tail form and the projection $m$ on the bottom of the container $n$ a corresponding shape; or two projections may be provided upon one part to engage with the sides of the dove-tail projection upon the other.

In re-charging the cells a counterpart of the dove-tail projection $m$ or of the recess is provided on the shelves of the charging boards, so as thus to render it impossible to put the cell in position with reversed polarity in charging.

The lid $i$ may be provided with a downwardly protruding flange $i^1$, upon the external periphery of which a circular rib $i^2$ may be formed, while a corresponding groove may be provided on the inside of the wall of the cell casing $e$ near the top edge, so that thus the lid $i$ may be pressed into position with the rib $i^2$ engaging in the groove as illustrated in Fig. 1. Thus the lid $i$ is securely held in position by simple means.

The respective plates or electrodes $a$ and $b$ are in determined positions at their upper edges provided with integral posts $a^1$ and $b^1$ which may be reduced in diameter where they pass through corresponding holes in the lid $i$, and spring pressed contact plungers $n^1$ may be mounted thereon adapted to make contact in recesses within the contact plate carried upon the top part of the lamp which may take the form shown in a drawing filed upon a co-pending application.

It will be understood that as is usual in the construction of miners safety lamps, the container for the reception of the cell is of a size corresponding to that of the cell, and that this container is adapted to be secured to the upper part of the lamp carrying the incandescent lamp within a glass cover, the casing being secured in a known way by means of a magnetic lock.

Such a cell is adapted for use with so called solid electrolyte.

I claim:

1. In electric batteries applicable for miners electric lamps, in combination, the cell casing, electrodes within the said casing one disposed within the other, supports for the said electrodes at the bottom of the said casing, said supports being integrally provided with the said casing, a central post also integral with the said casing, a lid for the cell casing, and means for securing the lid upon the upper end of the said central post, substantially as described.

2. In electric batteries applicable for miners electric lamps, in combination, the cell casing electrodes within said casing, the lamp top and a container for the said casing by which the said cell casing is carried beneath the lamp top, a recess and projection of a dove-tail shape being respectively provided within or upon the bottom of the said cell casing and the bottom of the said container, substantially as described.

THEODORE STRETTON.